United States Patent [19]

Matsuura et al.

[11] Patent Number: 5,458,175
[45] Date of Patent: Oct. 17, 1995

[54] PNEUMATIC TIRE WITH DIFFERENTLY SHAPED BEAD PORTIONS

[75] Inventors: Shinichi Matsuura, Osaka; Kenji Tagashira, Hyogo, both of Japan

[73] Assignee: Sumitomo Rubber Industries, Ltd., Kobe, Japan

[21] Appl. No.: 174,250

[22] Filed: Dec. 28, 1993

[30] Foreign Application Priority Data

Dec. 28, 1992 [JP] Japan .................. 4-358570

[51] Int. Cl.⁶ .................. B60C 3/04; B60C 3/06; B60C 15/02; B60C 15/024
[52] U.S. Cl. .................. 152/454; 152/456; 152/539; 152/544; 152/DIG. 6
[58] Field of Search .................. 152/455, 456, 152/539, 544, DIG. 6, 454

[56] References Cited

U.S. PATENT DOCUMENTS

| | | |
|---|---|---|
| 3,229,744 | 1/1966 | Bradley . |
| 3,656,532 | 4/1972 | Roberts .................. 152/539 |
| 3,842,882 | 10/1974 | Gough et al. .................. 152/544 |
| 4,124,679 | 11/1978 | DeWitt .................. 152/539 |
| 4,271,889 | 6/1981 | Pommier .................. 152/455 |
| 4,351,382 | 9/1982 | Corner et al. .................. 152/544 |
| 5,301,728 | 4/1994 | Brown, Jr. et al. .................. 152/455 |

FOREIGN PATENT DOCUMENTS

| | | |
|---|---|---|
| 1127632 | 12/1956 | France . |
| 2252233 | 6/1975 | France . |
| 2548970 | 1/1985 | France . |
| 0006206 | 1/1990 | Japan . |

Primary Examiner—Adrienne Johnstone

[57] ABSTRACT

The invention is directed to a pneumatic tire that can be mounted on a rim (wheel) to assure good engagement with the rim while preventing the occurrence of rim offsets. The bead portion $4a$ (as indicated by a solid line in FIG. 1) on the front side of a tire 1 which is later mounted on the rim has a bead base diameter $\phi_1$, a toe portion angle $\theta_1$, a contact angle $\alpha_1$, and a heel portion radius $R_1$, whereas the bead portion $4b$ (as indicated by a dashed line in FIG. 1) on the back side of the tire which is first mounted on the rim has a bead base diameter $\phi_2$, a toe portion angle $\theta_2$, a contact angle $\alpha_2$ and a heel portion radius $R_2$. The bead portion $4a$ on the front side has a different shape than the bead portion $4b$ on the back side and the following two relationships hold between the two bead portions; the angle of $\theta_2$ of the toe portion on the back side should be greater than the angle $\theta_1$ of the toe portion on the front side, with the difference between the two angles being not more than 4° ($4° \geq \theta_2 - \theta_1 > 0°$); and the bead base diameter $\phi_2$ on the back side should be greater than the bead base diameter $\phi_1$ on the front side ($\phi_2 > \phi_1$); preferably, the difference between the bead base diameters on the two sides ($\phi_2 - \phi_1$) is 2 mm or less ($\phi_2 - \phi_1 \leq 2$ mm).

5 Claims, 2 Drawing Sheets

PNEUMATIC TIRE WITH DIFFERENTLY SHAPED BEAD PORTIONS

The present invention relates to a pneumatic tire that is particularly adapted for mounting on a rim with an automatic tire/rim mounter by a mechanical force.

BACKGROUND OF THE INVENTION

Mounting tires on rims with automatic tire/rim mounters using a mechanical force is a practice that is used increasingly today. FIG. 3 shows an exemplary case of using such an automatic mounter to mount a pneumatic tire on a wheel, particularly one that has two dish-type rims connected in a bottom-to-bottom relationship, each rim having an annular hump in a position interior to the bead seat, with the bead of the tire engaging the bead seat between the hump and the rim flange and with an annular well of a smaller diameter than the bead seat being formed between the humps of the two rims. As shown, the wheel indicated by A is placed in such a way that the rotating face will lie horizontally. Then, the tire indicated by B is placed over the wheel A from above and the bead $B_1$ which is located in the lower position (i.e., the bead on the back side of the tire) is first caused to traverse the rim flange $A_1$ and the hump $A_3$ which are located in the upper part of the wheel A, whereby it is seated within the well $A_5$ between the humps $A_3$ and $A_4$ in the upper and lower positions, respectively. Subsequently, the bead $B_2$ which is located in the upper position (i.e., the bead on the front side of the tire) is pressed down by means of expanding rollers C so that the bead is caused to traverse the upper rim flange $A_1$ and hump $A_3$ to become seated within the well $A_5$. Thereafter, the tire is inflated, whereby the beads $B_1$ and $B_2$ on the front and back sides, respectively, of the tire will traverse the humps $A_3$ and $A_4$ in the upper and lower positions, respectively, so that they will be mounted in engagement both with the bead seat $A_6$ between the rim flange $A_1$ and the hump $A_3$ and with the bead seat $A_7$ between the rim flange $A_2$ and the hump $A_4$.

The conventional pneumatic tire, however, has had the problem that when one attempts to mount it on the wheel A having the two dish-type rims connected in a bottom-to-bottom relationship, part of the bead $B_1$ on the back side which has been first caused to be located within the well $A_5$ is not situated in the right position but it is partly caused to stop as it has run onto the hump $A_4$ in the lower position. If it is the bead $B_2$ on the front side that has run onto the upper hump $A_3$, one may tread upon it by foot or otherwise press it down to become seated within the well A.

If part of the bead $B_1$ on the back side of the tire runs onto the hump $A_4$, the rotating axis of the tire B will not coincide with that of the wheel A and the tire B becomes eccentric with the rim (wheel A) as shown in FIG. 4, whereby insufficient engagement will occur between the two components when the tire B is inflated.

If one attempts to solve this problem by increasing the inside diameter of the bead $B_1$ on the back side of the tire so that it will readily ride across the hump $A_4$, the force of engagement that develops after inflating the tire decreases to such a level that the bead is offset from the bead seat on the rim, thereby causing a rim offset.

SUMMARY OF THE INVENTION

An object, therefore, of the present invention is to provide a pneumatic tire that can be mounted on a rim (wheel) to assure good engagement with the rim while preventing the occurrence of rim offsets.

An object, therefore, of the present invention can be obtained by a pneumatic tire comprising an annular tread, a sidewall that extends radially from both ends of the tread, and a bead portion that is formed at the inner radial end of each sidewall, wherein the bead portions on the right and left sides of a cross-section of the tire including the axis of rotation are different in shape, with the difference between the two bead portions in terms of the angle of toe portion θ exceeding 0° but not more than 4° and wherein the bead portion having the greater angle of toe portion θ is formed to have a greater bead base diameter φ than the other bead portion.

In a preferred embodiment of the invention, the two bead portions are adapted to have the same heel length d.

In another preferred embodiment of the invention, the two bead portions are adapted to be equal in terms of both the bead toe position and the bead length D.

In accordance with the present invention, the bead portions on the right and left sides of the tire are adapted to be different in shape and the difference between the two bead portions in terms of the angle of toe portion θ is controlled to exceed 0° but not more than 4° while, at the same time, the bead portion having the greater angle of toe portion θ is formed to have a greater bead base diameter φ than the other bead portion. This arrangement insures that when mounting the pneumatic tire on a rim, the bead portion having the greater angle of toe portion θ is first brought into engagement with the rim so that it is seated smoothly within the well and, upon subsequent inflation of the tire, the bead portion is displaced from within the well to ride across the hump smoothly until it comes into engagement with the bead seat.

DETAILED DESCRIPTION OF THE EMBODIMENTS

Figure 2:
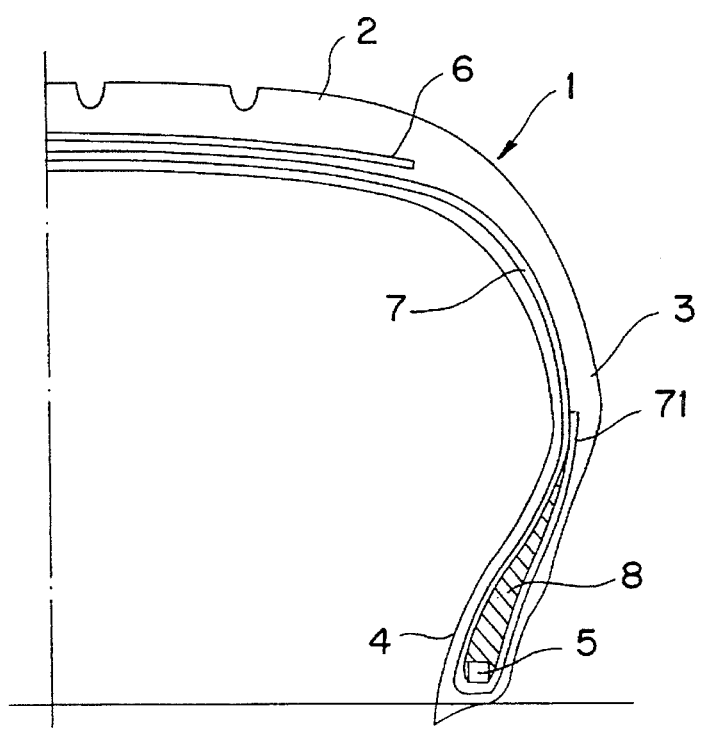
FIG. 2 shows a cross-section including the rotating axis of a tire that adopts the concept of the present invention.

FIG. 2 is a diagram showing a cross-section of the pneumatic tire of the present invention including the axis of its rotation. As shown, the pneumatic tire generally indicated by 1 comprises: an annular tread 2; a pair of sidewalls 3 that extend radially from opposite ends of the tread 2; an annular bead portion that is formed at the internal radial end of each sidewall 3; an annular bead core 5 that is embedded in the bead portion 4; an annular belt 6 that is embedded in the tread 2 circumferentially around the tire; a carcass 7 that penetrates through the internal radial part of the belt 6 in the tread 2 and through sidewalls 3 and which is turned up at both ends around the bead core 5 by extending from the internal axial end through the internal radial part to towards the external axial end of the tire; and a bead apex 8 of a generally triangular cross section in shape that is provided at the external radial end of the bead core 5 between the carcass 7 and its turnup portion 71.

Figure 1:
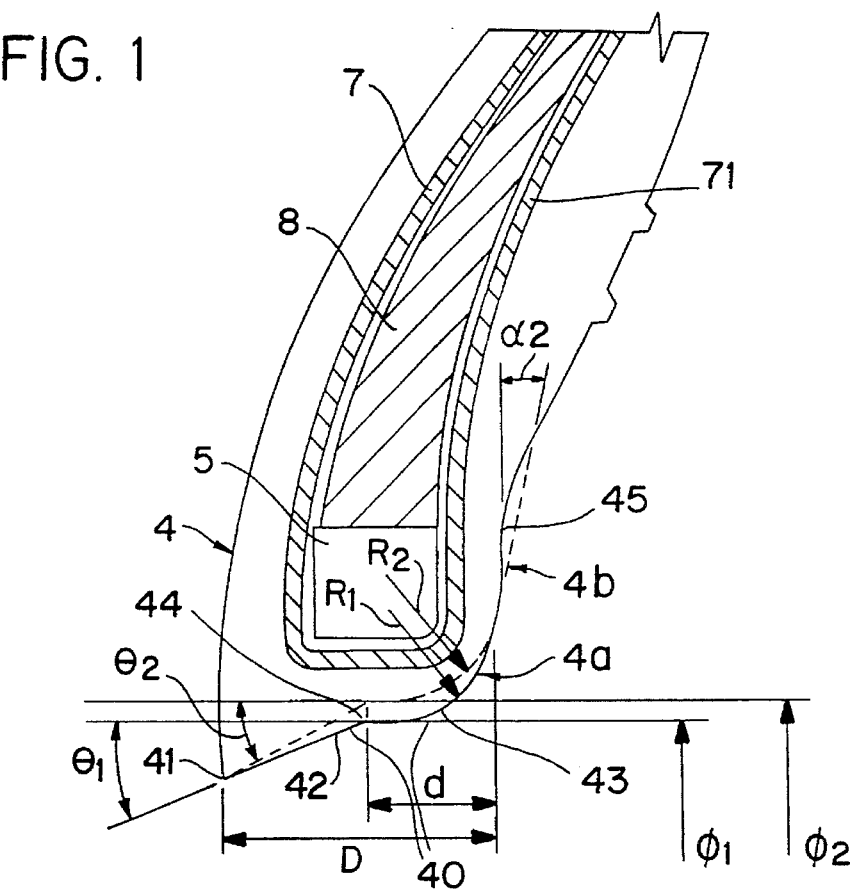
FIG. 1 is a cross-sectional view showing enlarged the essential part of a pneumatic tire according to an embodiment of the present invention.

Referring now to FIG. 1 which is a cross-sectional view showing the essential part of the pneumatic tire enlarged, the bead base 40 of the bead portion 4, as seen in a section taken along a plane including the rotating axis of the tire, comprises a bead toe portion that extends axially outward from the bead toe 41 at the internal axial end of the bead portion 4 linearly at a predetermined angle with respect to the direction of the axis of the tire, and a bead heel portion that extends from the junction area 44, which is the external axial end of the bead toe portion 42, towards the flange contact region 45 in contact with the rim flange on the axial outer side face of the bead portion 4 by describing an arc of a circle.

Figure 3:
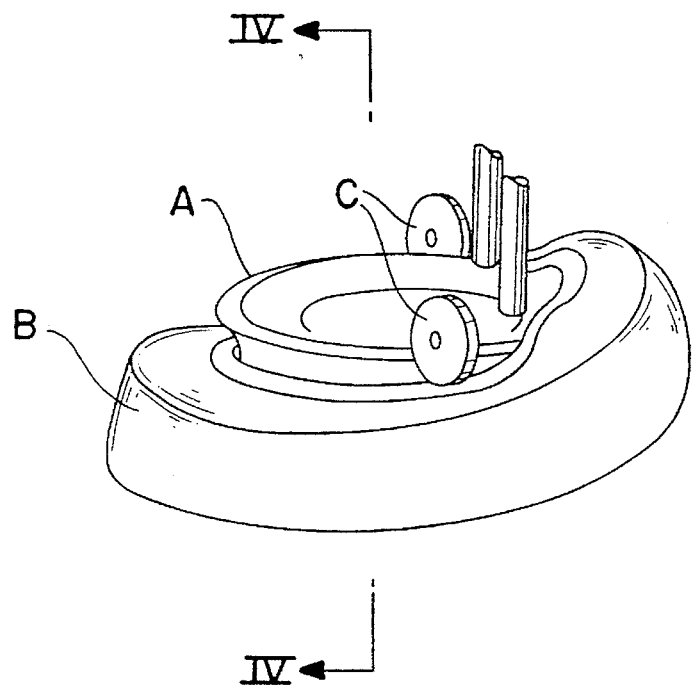
FIG. 3 is a perspective view illustrating how the tire is mounted on a rim.
Figure 4:
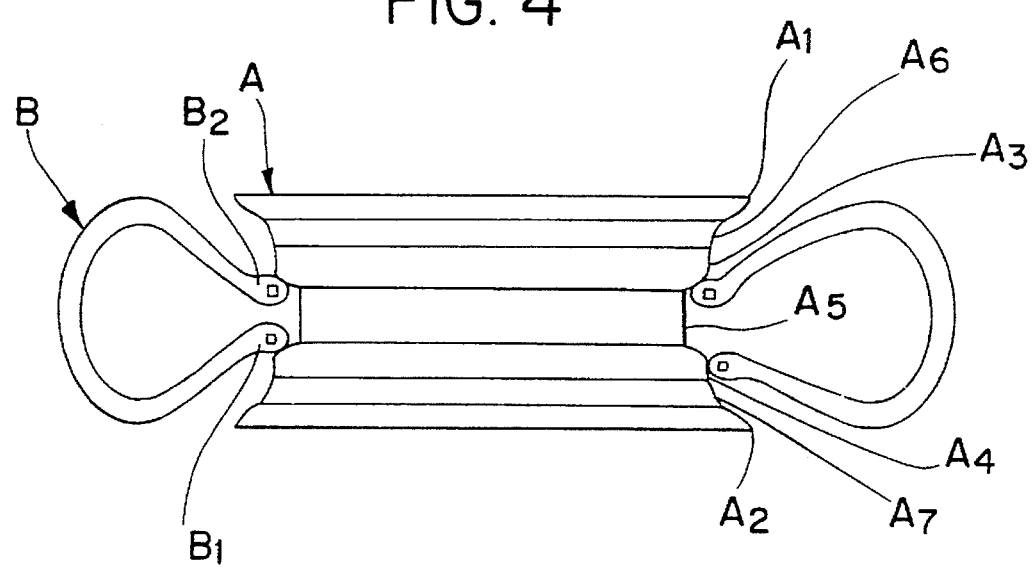
FIG. 4 shows a cross-section of FIG. 3 as taken on line IV—IV.

The following symbols are used to designate the parameters of various parts of the pneumatic tire 1: $\phi$ for the bead base diameter that refers to the inside diameter of the junction area 44 between the bead toe portion 42 and the bead heel portion 43; d for the heel portion length that refers to the axial distance from the junction area 44 to the flange contact region 45; D for the bead base length that refers to the axial distance from the bead toe 41 to the flange contact region 45; $\theta$ for the toe portion angle that refers to the angle the bead toe portion 42 forms with the axis of the tire; $\alpha$ for the contact angle that refers to the angle the flange contact region 45 forms with a plane parallel to the equatorial plane of the tire; and R for the heel portion radius that refers to the radius of curvature of the bead heel portion For the purpose of the present discussion, the side of the tire 1 which is first mounted on the rim (i.e., the lower side in FIGS. 3 and 4) is called the "back side" and the side of the tire 1 which is later mounted on the rim (i.e., the upper side in FIGS. 3 and 4) is called the "front side" The bead portion 4a on the front side (as indicated by a solid line in FIG. 1) has a bead base diameter $\phi_1$, a toe portion angle , $\theta_1$, a contact angle $\alpha_1$ and a heel portion radius $R_1$, whereas the bead portion 4b on the back side (as indicated by a dashed line in FIG. 1) has a bead base diameter $\phi_2$, a toe portion angle $\theta_2$, a contact angle $\alpha_2$ and a heel portion radius $R_2$. According to the present invention, the bead portion 4a on the front side has a different shape than the bead portion 4b on the back side and the following two relationships hold between the two bead portions.

It should be noted here that in the embodiment under consideration, the bead base length D and the heel portion length d are each adapted to be equal on the front and back sides. Further, the position of the bead toe 41 on the front side is adjusted to be the same as that of the bead toe 41 on the back side (namely, the inside diameter of the bead toe 41 is made equal on the front and back sides) and, at the same time, the radius R of the heel portion is also made equal on both sides ($R_2=R_2$).

The first condition to be met is that the angle $\theta_2$ of the toe portion on the back side be greater than the angle $\theta_1$ of the toe portion on the front side, with the difference between the two angles being not more than 4° ($4° \geq \theta_2-\theta_1>0°$ ).

If the angle $\theta_2$ of the toe portion on the back side is equal to the angle $\theta_1$ of the toe portion on the front side ($\theta_2-\theta_1=0°$ ), the bead base length D and the heel portion length d are each the same on the back and front sides. In other words, the bead portions 4a and 4b on the front and back sides, respectively, are the same in shape and the bead portion 4b on the back side is prone to run onto the hump of the rim on the back side and no improvement is achieved in the precision of engagement, but rather, poor engagement will result to increase the chance of air leakage.

If the difference between the angles of the two toe portions ($\theta_2-\theta_1$) exceeds 4° ($\theta_2-\theta_1>4°$ ), the rigidity of the bead toe portion 42 of the bead portion 4b on the back side will decrease and the force of sticking to the bead seat of the rim will drop to cause a rim offset.

If the angle $\theta_2$ of the toe portion on the back side is made smaller than the angle $\theta_1$ of the toe portion on the front side ($\theta_2-\theta_1<0°$), the bead base diameter $\phi_2$ on the back side will decrease, making it difficult for the bead portion 4b on the back side to ride across the hump of the rim on the back side. On the other hand, such bead portion is liable to run onto that hump. As a result, no improvement is achieved in the precision of engagement and the chance of occurrence of poor engagement will increase.

The second condition to be met is that the bead base diameter $\phi_2$ on the back side be greater than the bead base diameter $\phi_1$ on the front side ($\phi_2>\phi_1$). Preferably, the difference between the bead base diameters on the two sides ($\phi_2-\phi_1$) is 2 mm or less ($\phi_2-\phi_1<2$ mm).

Considering first the case where the bead base diameter $\phi_2$ on the back side is smaller than the bead base diameter $\phi_1$ on the front side ($\phi_2<\phi_1$), if the bead base diameter $\phi_2$ on the back side is unduly small, it will be difficult for the bead portion on the back side 4b to engage effectively with the rim and said bead portion is prone to run onto the hump, thereby deteriorating the precision of engagement. If the bead base diameter $\phi_1$ is excessive, the force by which the bead portion 4a on the front side will stick to the bead seat of the rim will drop to cause not only a rim offset but also air leakage.

Considering next the case where the difference between the bead base diameters on the front and back sides ($\phi_2-\phi_1$) exceeds 2 mm ($\phi_2-\phi_1>2$ mm), the effect of this case is either that the bead base diameter $\phi_1$ on the front side is unduly small or that the bead base diameter $\phi_2$ on the back side is excessive. If the former is the case, an extremely great force is required for the bead portion 4a on the front side to establish effective engagement with the rim, thus lowering the precision of engagement. If the latter is the case, the force by which the bead portion 4b on the back side will stick to the bead seat of the rim will drop to cause not only a rim offset but also air leakage.

If desired, the contact angle $\alpha$ may be adjusted to range from 0 (inclusive) to 2° (inclusive) and in this case, the bead portion 4 will readily disengage from the well in the wheel so that it can be easily moved to the bead seat. If the contact angle $\alpha$ exceeds 2°, the force of contact with the rim flange will drop, thereby reducing the precision of engagement on the other hand, if the contact angle $\alpha$ is less than zero degrees, it will be difficult for the bead portion 4 to disengage from the well in the wheel, which also causes deterioration in the precision of engagement.

Shown below in Table 1 are the specifications of two tires of the size 215/60R15, one being constructed in accordance with an example of the present invention and the other using a conventional structure. The structural features other than the shape of the bead portion, the materials used and the patterns employed were commonly shared by the two tires.

TABLE 1

| | Example | | Comparative Example | |
|---|---|---|---|---|
| | back side | front side | back side | front side |
| $\theta$ | $\theta_2 = 20°$ | $\theta_1 = 17°$ | $\theta_2 = 17°$ | $\theta_1 = 17°$ |
| $\phi$ | $\phi_2 = 378.2$ mm | $\phi_1 = 377.3$ mm | $\phi_2 = 377.3$ mm | $\phi_1 = 377.3$ mm |
| d | d = 6.4 mm | d = 6.4 mm | d = 6.4 mm | d = 6.4 mm |
| D | D = 14.5 mm | D = 14.5 mm | D = 14.5 mm | D = 14.5 mm |
| $\alpha$ | $\alpha_2 = 2°$ | $\alpha_1 = 0°$ | $\alpha_2 = 2°$ | $\alpha_1 = 0°$ |
| R | $R_2 = 6.4$ mm | $R_1 = 6.4$ mm | $R_2 = 6.4$ mm | $R_1 = 6.4$ mm |

Notes:
$\theta$, the angle of the toe portion; $\phi$, the bead base diameter; d, the length of the heel portion; D, the bead base length; $\alpha$, contact angle; R, the radius of the heel portion.

Having the construction described herein above, the present invention offers the following advantages.

In accordance with the present invention, the bead portions on the right and left sides of the tire are adapted to be different in shape and the difference between the two bead portions in terms of the angle of toe portion is controlled to exceed 0° but not more than 4° while, at the same time, the bead portion having the greater angle of toe portion $\theta$ is formed to have a greater bead base diameter $\phi$ than the other bead portion. This arrangement ensures that when mounting the pneumatic tire on a rim, the bead portion having the greater angle of toe portion $\theta$ is first brought into engagement with the rim so that it is seated smoothly within the well and, upon subsequent inflation of the tire, the bead portion is displaced from within the well to ride across the hump smoothly until it comes into engagement with the bead seat.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pneumatic tire comprising an annular tread, a sidewall that extends radially from each axial end of the tread, and a bead portion that is formed at the inner radial end of each said sidewall, each bead portion including a bead base having an axially inward bead toe, a bead toe portion, the bead toe portion extending axially outward from the bead toe at an angle $\theta$ to the axis of the tire, and a bead heel portion, wherein the bead portions on the right and left sides of a cross-section of the tire including the axis of rotation differ in shape, with the difference between the angle $\theta$ of one bead toe portion and the angle $\theta$ of the other bead toe portion exceeding 0° but not more than 4° and wherein the bead portion having the greater bead toe portion angle $\theta$ has a greater bead base diameter $\phi$ than the other bead portion.

2. The pneumatic tire according to claim 1 wherein each bead heel portion has an axial length d and the two bead portions have the same axial length d.

3. The pneumatic tire according to claim 1 wherein the bead base has a bead base axial length D and the two bead portions are equal in terms of both a bead toe position and the bead base axial length D.

4. The pneumatic tire according to claim 2 wherein the bead base has a bead base axial length D and the two bead portions are equal in terms of both a bead toe position and the bead base axial length D.

5. The pneumatic tire according to claim 1, wherein the difference in bead base diameter between the bead portion having the greater bead toe portion angle $\theta$ and the other bead portion is equal to or less than 2 mm.

\* \* \* \* \*